United States Patent
Sakata et al.

[15] 3,649,959
[45] Mar. 14, 1972

[54] VEHICLE DISK BRAKE LINING WEAR

[72] Inventors: Mamoru Sakata; Hiroyuki Komori, both of Tokyo; Katsuhiko Fujii, Fukuoka-Machi, all of Japan

[73] Assignee: Honda Giken Kogyo Kabushiki Kaisha, Tokyo, Japan

[22] Filed: July 7, 1970

[21] Appl. No.: 52,930

[30] Foreign Application Priority Data

July 23, 1969 Japan....................................44/69978

[52] U.S. Cl. ........................................340/52 A, 200/61.44
[51] Int. Cl. ......................................................G08b 21/00
[58] Field of Search ................340/52, 52 A, 52 B; 200/61.4, 200/61.44

[56] References Cited

UNITED STATES PATENTS

| | | |
|---|---|---|
| 1,902,759 | 3/1933 | Cataudella....................340/52 A UX |
| 2,217,176 | 10/1940 | Madison........................340/52 A UX |
| 3,479,640 | 11/1969 | Puma...............................340/52 A X |
| 3,223,795 | 12/1965 | Yerman.........................340/52 A UX |
| 3,271,737 | 9/1966 | Bezemek.............................340/52 A |
| 3,456,236 | 7/1969 | Labartino et al.....................340/52 A |
| 3,553,642 | 1/1971 | Rike et al............................340/52 A |

*Primary Examiner*—Alvin H. Waring
*Attorney*—Waters, Roditi, Schwartz & Nissen

[57] ABSTRACT

An abrasion detecting apparatus for a friction member comprises a detecting switch having facing electric contacts constituted on the one hand as a rotating member such as the brake disk and on the other hand a lead wire embedded in a friction member such as a brake pad facing the rotating member. The switch is interposed in a circuit having an indicating device such as a lamp connected to an electric source. The portion of the lead wire embedded in the friction member is covered over the entire surface thereof with an insulating layer such as an insulating tube.

6 Claims, 4 Drawing Figures

PATENTED MAR 14 1972    3,649,959

INVENTOR
Mamoru Sakata
Hiroyuki Komori
BY Katsuhiko Fujii

VEHICLE DISK BRAKE LINING WEAR

BRIEF SUMMARY OF THE INVENTION

The invention relates to apparatus for detecting wear in a friction member. The friction member may be a brake pad in a disk brake, a brake shoe in drum brakes, a clutch shoe in a friction clutch, or the like.

The apparatus according to the invention includes means for detecting when a predetermined wear or abrasion in the friction member has occurred and to signal the time for replacement of the friction member.

According to the invention there is provided abrasion detecting apparatus comprising first and second frictionally engageable members, one member being of abradable material, and detection means for detecting and indicating abrasion of said one member beyond a predetermined amount and (including switch means) inclusive on the one hand the other of said members and on the other hand a lead wire embedded in said one member, and insulation means covering said lead wire in entirety at least in the portion thereof embedded in said one member.

DETAILED DESCRIPTION

This invention relates to an apparatus which, when an abrasion of a friction member such as a brake pad in a disk brake, a brake shoe in a shoe brake, a clutch shoe in a friction clutch or the like has reached a predetermined limit, detects it and thereby notices the time for replacement of such a member.

Figure 4:
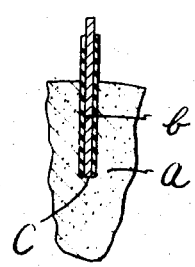
FIG. 4 is a sectional view showing an arrangement according to the prior art.

In the known apparatus as shown in FIG. 4 a lead wire $b$ is embedded in a friction member $a$ and the wire $b$ and a rotating member, such as a brake disk facing the member $a$, are constructed as electrical contacts facing one another for forming a detection switch, so that when the two contacts are brought into contact with another in the course of the abrasion of the friction member $a$, that is, when the lead wire $b$ is exposed in the course of the abrasion of the friction member $a$ and thereby is brought into mechanical and electrical contact with the facing rotating member, an electrical circuit for a detecting device is closed so that the device is operated by flow of electric current. It is usual in this conventional arrangement that the lead wire $b$ embedded in the friction member $a$ is bare in entirety or is partly bare at least at its end $c$ as shown in FIG. 4, for example, as a result of cutting a covered electric wire. Additionally, the friction member $a$ contains large quantities of a good electrical conducting material such as iron powder, aluminum powder or the like. Accordingly, it has been found from the results of the inventors' research that, often, when the member $a$ becomes wet from rain water or the like, the wet portion becomes an electrical conductor to produce an electric current flow between the two contacts. Hence, even if the friction member $a$ is not yet abraded, the detecting switch operates as if the same were closed, so that an electric current flows through the detecting circuit to operate the detecting device.

Figure 1:
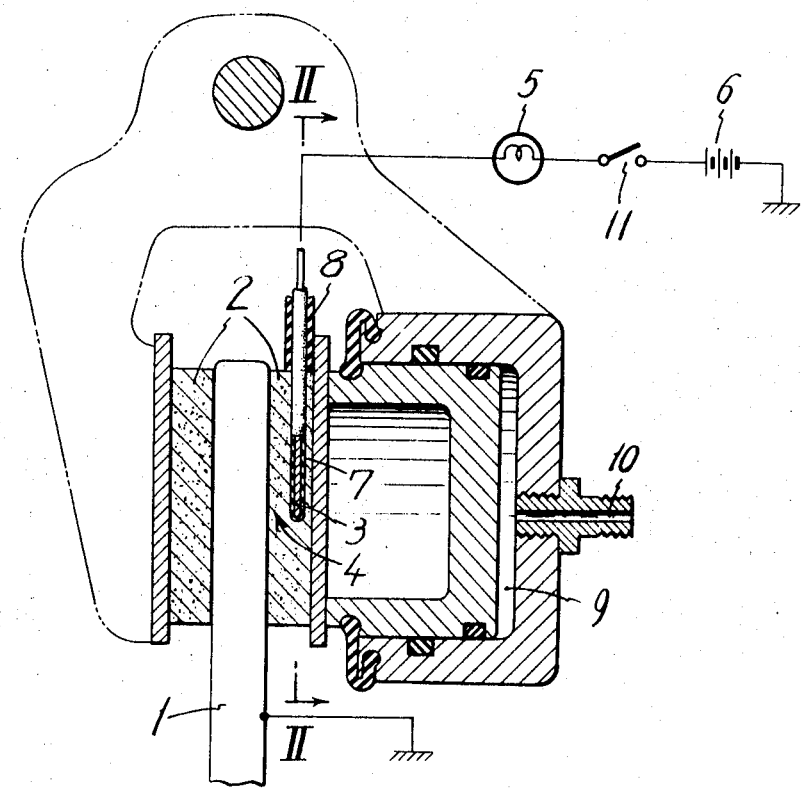
FIG. 1 is a side view, partly in section, of one embodiment according to this invention.

The invention has been developed in consideration of this, and according to this invention there is provided an apparatus of the type in which a detecting switch 4 is formed having mutually facing electrical contacts comprising a rotating member 1 such as a brake disk or the like and a lead wire 3 embedded in a friction member 2 such as a brake pad or the like facing the rotating member 1. As seen in FIG. 1, the lead wire 3 is elongated and extends linearly, in parallel relation to member 1, from the periphery of member 2 to the region of the center thereof. The switch 4 is interposed in a connecting circuit including a detecting device 5 such as a lamp and an electric source 6. In accordance with the invention, at least that portion of lead wire 3 embedded in the friction member 2 is covered throughout the entire surface thereof with an insulating layer 7 such as an insulating tube.

Figure 2:
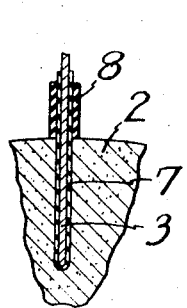
FIG. 2 is a sectional view taken along line II—II in FIG. 1.
Figure 3:
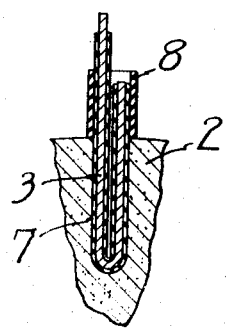
FIG. 3 is a sectional view similar to FIG. 2 of a modified embodiment of the invention.

As the means for the entire surface covering, it can be considered, for instance, that the insulating layer 7 around the periphery of the lead wire 3 is closed at its end as if it were formed into a baglike shape as shown in FIG. 2 or that the end thereof is not closed but a conventional type of lead wire 3 with the insulating layer 7 is bent back on itself so that the end thereof projects out of the friction member 2 as shown in FIG. 3.

According to the arrangement as shown in FIG. 3, it is only necessary that a long lead wire, only the peripheral surface of which has been previously insulation-covered, is cut in succession, so as to be advantageous for mass production. Numeral 8 denotes a protection tube applied to cover the projecting part of the lead wire 3.

The drawing illustrates the case where the invention is applied to a disk brake. In this case, the friction member 2 constitutes a brake pad, and a pair of the pads are arranged so as to face the opposite surfaces of a brake disk comprising the rotating member 1, and the construction is such that the members 2 are actuated by an oil pressure piston cylinder 9 provided on one side thereof. Numeral 10 denotes an oil inlet opening and numeral 11 denotes a hand operated switch interposed in the detection circuit.

According to this invention, at least that portion of the lead wire 3 which is embedded in the friction member 2 is covered throughout the entire surface thereof with the insulating layer 7, so that even when, for example, the friction member 2 becomes wet with rain water or the like, there will never be any accidental current flow, that is, any accidental operation of the detecting device, and thus the arrangement is effective in preventing any erroneous operation and it is simple in construction and low in manufacturing cost.

What is claimed is:

1. Abrasion detecting apparatus for a disk brake assembly constituted by a rotatable disk member and an abradable friction member facing the disk member and applicable thereagainst to develop friction and slow the rotatable disk member, said detecting apparatus comprising an elongate lead wire embedded in said friction member and extending linearly in substantially parallel relation to said disk member, said lead wire extending inwardly from the periphery of the disk member to the region of the center of the friction member, and insulation means covering said lead wire in entirety in the portion thereof embedded in the friction member.

2. Abrasion detecting apparatus as claimed in claim 1 wherein said insulation means comprises an insulating envelope of tubular shape completely enclosing the embedded portion of the lead wire in said one member.

3. Abrasion detecting apparatus as claimed in claim 1 wherein said insulation means comprises an insulation layer on said lead wire, said wire having an exposed end, said wire being folded onto itself so that said exposed end extends outside said one member and the remainder of the wire embedded in said one member is completely covered by said layer.

4. Abrasion detecting apparatus as claimed in claim 3 comprising an insulation tube on said one member enclosing the lead wire where it projects from said one member to cover said exposed end.

5. Abrasion detecting apparatus as claimed in claim 3 wherein said wire is constituted of a subdivided length of wire with the insulation layer thereon.

6. Abrasion detecting apparatus as claimed in claim 1 comprising an insulation tube on said one member enclosing the lead wire where it projects from said one member.

* * * * *